United States Patent [19]

Kägi

[11] Patent Number: 4,604,901

[45] Date of Patent: Aug. 12, 1986

[54] HYDRAULIC PRESSURE RECEIVER

[75] Inventor: Bruno Kägi, Meilan, Switzerland

[73] Assignee: St Sensortechnik AG, Chur, Switzerland

[21] Appl. No.: 662,296

[22] PCT Filed: Jan. 30, 1984

[86] PCT No.: PCT/CH84/00013

§ 371 Date: Sep. 20, 1984

§ 102(e) Date: Sep. 20, 1984

[87] PCT Pub. No.: WO84/02977

PCT Pub. Date: Aug. 2, 1984

[30] Foreign Application Priority Data

Jan. 31, 1983 [CH] Switzerland .............. 527/83

[51] Int. Cl.$^4$ .............................................. G01L 7/08
[52] U.S. Cl. .......................................... 73/731; 73/172
[58] Field of Search ................. 73/146.2, 731, 706, 73/707, 730, 172

[56] References Cited

U.S. PATENT DOCUMENTS 2,261,027 10/1941 Hopkins ............................ 73/731
4,052,903 10/1977 Thordarson ...................... 73/731

Primary Examiner—Donald O. Woodiel
Attorney, Agent, or Firm—Karl F. Ross; Herbert Dubno

[57] ABSTRACT

An elongated elastically deformable housing is responsive to external force applied thereto and is connectable to a pressure evaluation device. A rigid tube longitudinally traverses the housing and defines therewith a closed annular space around the tube, which has a plurality of radial bores formed therein in an array extending the length of the housing and connecting the interior of the tube with the annular space, a hydraulic fluid being contained in the annular space and the tube. Means are provided at one end of the tube for the connection thereof to the pressure evaluation device.

11 Claims, 2 Drawing Figures

HYDRAULIC PRESSURE RECEIVER

FIELD OF THE INVENTION

The present invention relates to a hydraulic pressure receiver by which the incompressible fluid is found in an elastic tubular housing that acts upon an external pressure and which is connectable to a pressure guage or transformer.

BACKGROUND OF THE INVENTION

In many areas of engineering, hydraulic pressure receivers are used which are capable of receiving changing external ratios of load and transmitting them to a suitable measuring instrument or recording means or ac-vf converter. For this, an incompressible fluid, such as water, is found in a compressible housing of, for example, rubber-like material, which is connectable to the measuring means.

It has become apparent with such pressure receivers that only very short, compact pressure receivers, by which the compressive load can take place evenly over the whole length of the housing, pass precise and always constant relative pressure values to the measuring means, as such pressure receivers function as hydrostatic piston-cylinder systems.

However, as soon as a tubular-shaped housing of a relatively great length is used, as is required, for example for the monitoring of changes of pressure over large distances or surface areas, great deviations in the measured relative pressure values occur by the same compressive load on the housing and, that is, in dependence on the distance of the area receiving the load from the point of attachment of the elastic pressure receiver housing on the measuring means.

The reason for this is the elastic housing's no longer being even over its whole extent but now point loaded, which, under the inward deformation of a part of the housing wall, the displaced fluid is able to flow to another place owing to the outward deformation on the housing wall, and, moreover, the pressure impulse continues wave-like in the fluid, whereby the wave energy, as is generally known, diminishes by the square of the distance from the wave centre (pressure impact point). The farther the distance, therefore, of the pressure impact on the housing wall from the load-receiving point of the elastic pressure receiver on the measuring means takes place, so the smaller the measured relative pressure becomes. This restricts, of course, the scope of application of such hydraulic pressure receivers by a considerable extent.

OBJECT OF THE INVENTION

It is therefore the object of the present invention to create a hydraulic pressure receiver of the previously mentioned type, which, with the avoidance of the described disadvantages of the known technical level, can be of considerable length and is able to be acted upon by pressure at any desired place of the elastic pressure receiver housing without having to expect by the same pressure, deviations in the relative measured values.

SUMMARY OF THE INVENTION

This is achieved in accordance with the invention in that the inside of the tubular housing is an inflexible tube, at least approximately concentric, extending lengthwise in the housing, the casing thereof defining with the inside wall of the housing an annular clearance, which is closed at both its face ends, whereby it is foreseen that the inner tube is connected at one of its ends to the pressure guage or transformer, and has a plurality of radial bores distributed over the whole length of the tube.

By means of these measures it is henceforth possible, in the first place, to eliminate the fault caused by the damping of the pressure conveying fluid, for the fluid pressure is no longer measured in an elastic pressure receiver housing but in an inflexible inner tube. In addition, being that the inner tube is provided with a plurality of radial bores distributed over the whole length of the tube, the said bores create, at a pressure impact on the elastic pressure receiver housing, transverse components forming the pressure wave that spreads in the ring clearance, and, according to the theory of the spreading of waves in a confined space, new wave centers directed in the inside of the inner tube; at each radial bore the continually diminishing wave energy in the inner tube receives a counterbalancing energy impulse that compensates for the loss of energy.

Therewith results also, regardless of which place the elastic outer casing receives the impact of pressure, always the same relative measurement of pressure for the same pressures.

In this connection it has been found that the best results are achieved if the radial bores in the casing of the inner tube have a jet-like diameter, and if, in each case, preferably three radial bores are arranged in one sectional plane of the inner tube with equal angular distance, whereby such arrangement of radial bores are repeated over the whole length of the inner tube with specified, preferably equal spacing.

Furthermore, it is of advantage, as far as constancy in the results of measurements are concerned, if the inside of the housing stands under an excess pressure of preferably 0.01 bar.

Moreover, it has proved beneficial if the incompressible fluid in the inside of the housing is water, if required with an anti-freeze agent.

An easy-to-build and sturdy construction of the hydraulic pressure receiver in accordance with the invention is achieved, moreover, in that the inner tube is supported at the face ends of the housing, and that further, the inner tube possesses a coupling at its connecting end, which penetrates the face end of the housing, which, in addition, is sealed resistant to compression at the end opposite the connecting end, and that the sealed face end of the inner tube is provided with a venting screw.

Further, the present invention concerns a utilization of the hydraulic pressure receiver in accordance with the invention as a tread mat by placing a plurality of such pressure receivers next to one another, which are connectable to an evaluation apparatus.

BRIEF DESCRIPTION OF THE DRAWING

A practicable constructional example of the invention is shown with the aid of the drawing, in which.

SPECIFIC DESCRIPTION

Figure 1:
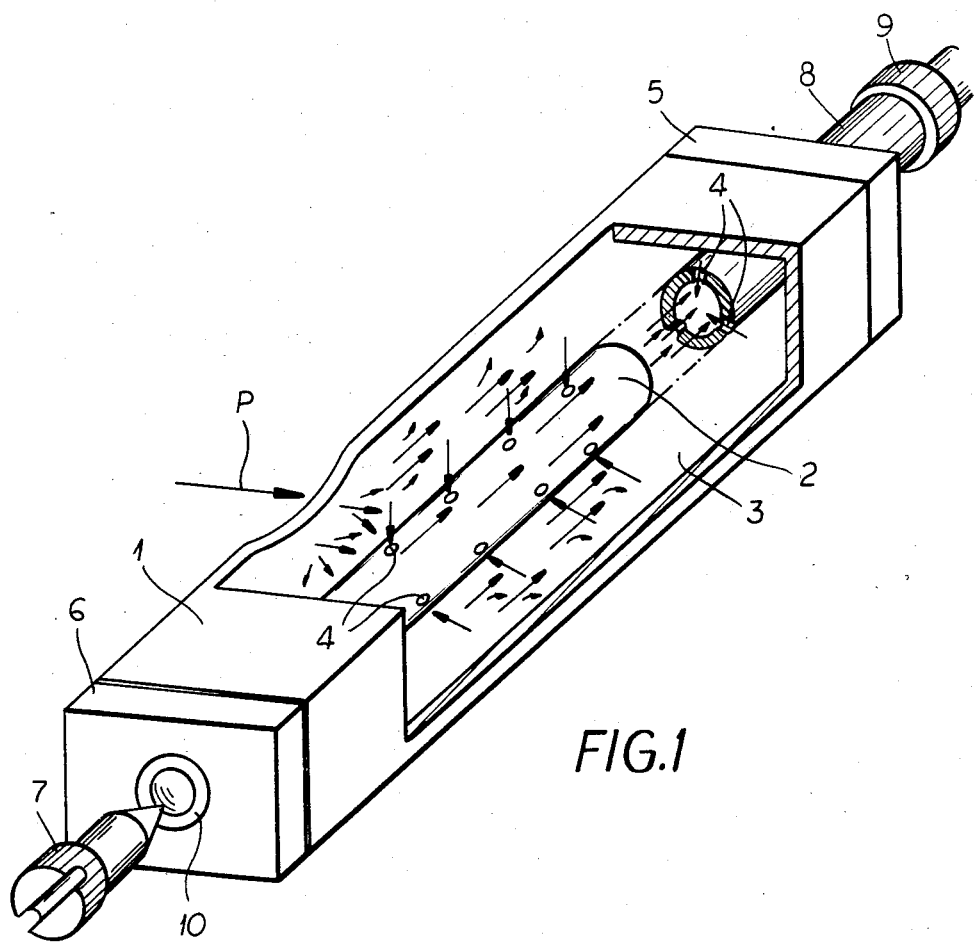
FIG. 1 is a perspective view with parts broken away of a hydraulic receiver according to the invention.

The illustrated pressure receiver comprises, in the first place, in a conventional way, an elastic outer tube 1 of a suitable elastomer or the like, of, for example, a practical length of 100 cm or more. The cross-section of the tube 1 is optional in shape and here a rectangular form has been adopted. The aperature width of the pressure receiver tube 1 can be, for example, 10×20 mm. The tube 1 can be, moreover, adhered to a base support (not illustrated) or, for example, comprise on an outer wall a longitudinal profile for attaching the arrangement to a ground guide rail.

In accordance with the invention, in the inside of the tubular housing 1 is an inflexible tube 2 of a suitable material, for example brass, which is concentric and extends lengthwise in the housing. The outer casing of this inner tube 2 and the inner wall of the housing 1 define as a result an annular clearance 3, which is closed at both face ends 5 and 6 of the tubular housing 1. With this, the ends 8 and 10 of inner tube 2 are supported leakproof in a suitable manner at said face ends 5 and 6 respectively. Furthermore, the inner tube 2 possesses at its connecting end 8 a suitable coupling 9, which appropriately penetrates the face end 5 of the housing 1. With this coupling 9, the inner tube 2 is connectable to a pressure guage or evaluation apparatus or ac-vf converter of the like (not illustrated). At its other end 10, the inner tube 2 is sealed resistant to pressure, whereby this face end of the inner tube is provided with a venting screw 7, which permits the whole system to be ventilated accordingly. The annular space 3 formed between the tube 2 and the housing 1 is relatively small in comparison with the diameter of the inner tube 2, which has, by way of example, an external diameter of 5 mm and an inner diameter of 4 mm, the housing wall dimensions being only slightly larger. It goes without saying, that these values are given only as examples, which have lead to the results mentioned by way of introduction. Any deviations from these measurements are, however, by all means possible within the scope of the invention.

The inner tube 2 is, furthermore, in a manner essential to the invention, provided with a plurality of radial bores 4. These radial bores 4 have a jet-like diameter of, say, 1 mm, and are distributed over the whole length of the inner tube 2.

It has proved to be essential that in each case, preferably three radial bores 4 are arranged in one sectional plane of the inner tube 2 with the same angular distance on the extent of the inner tube, as can be seen in the drawing. Further, it has proved to be of advantage if such arrangements of radial bores are repeated over the whole length of the inner tube 2 with specified, preferably equal spacing. These spacings can be 10 cm, for example.

The whole prescribed system is filled with water, for example, if required with an anti-freeze agent, and stands under a prestressing pressure of 0.01 to, for example, 0.7 bar in order to increase the compressive strength of the elastic pressure receiving housing 1.

If, then, a compressive force P (Figure) acts on any point of the outer casing of the elastic housing 1, the fluid in the system receives through the corresponding inward deformation of the respective part of the housing wall a pressure impulse that continues, as previously described, wave-like in the annular clearance 3. Here also results thereby, depending on the distance of the starting pressure impulse from the connecting end 5 of the system, a flow back of the liquid displaced in the annular clearance 3 by a more or less strong outward deformation of the housing wall, which leads to a decrease in pressure and, additionally, the previously described reduction of the wave energy owing to the distance.

However, now that the prevalent change of pressure is measured in the inner tube 2, and as the inner tube 2 reacts considerably differently to the elastic outer housing, these pressure losses mentioned before, now play only a disregardable role. In actual fact, namely the transverse components create at each radial bore 4 of the inner tube the pressure wave that spreads in the annular clearance 3 the energy impulse directed into the inside of the inner tube. This said energy impulse supports and increases the energy of the progressive wave at each point of a radial bore arrangement. It has become apparent that in this way, by practically any desired length of pressure receiver housings and a pressure impact at any desired place on the housing, the same relative test data are always obtained for the same pressures.

Owing to the previously described measures in accordance with the invention, the accuracy of measurement of hydraulic pressure receivers of the kind here in question is, compared with existing systems, increased many times over, and, so, the scope of application of such systems is enlarged considerably.

Figure 2:
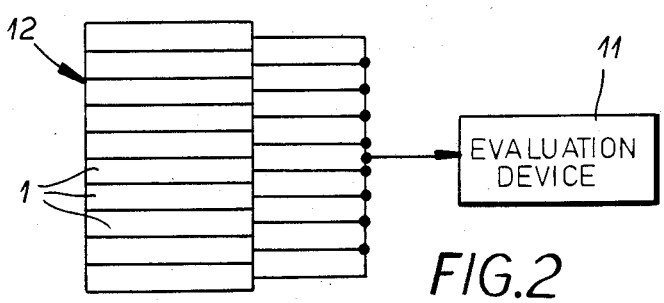
FIG. 2 is a diagrammatic view showing one application of the invention.

Therefore, it is now possible, for example as shown in FIG. 2, to build a so-called tread mat 12 by placing next to one another a plurality of such specified hydraulic pressure receivers and connecting the whole system to a suitable pressure evaluation device 11 in order to make, for example, a diagnostic means available to orthopedists for precise measuring and recording of motions when the tread mat is walked on. Furthermore, for instance, the strain on the anklebones or other pressure-generating processes of an athlete can be examined. Of no lesser importance is such an apparatus to veterinary medicine in order to, for example, measure and record the load pressure of the hooves of animals, such as horses, when they are lead over the tread mat.

I claim:

1. A hydraulic pressure receiver comprising:
   an elongated elastically deformable housing responsive to external force applied thereto and connectable to a pressure evaluation device;
   a rigid tube longitudinally traversing said housing and defining therewith a closed annular space around said tube;
   a plurality of radial bores formed in said tube in an array extending the length of said housing and connecting the interior of said tube with said space;
   a hydraulic fluid contained in said annular space and said tube; and
   means at one end of said tube for the connection thereof to said pressure evaluation device whereby the application of said force to said housing generates an increase in pressure within said space, which is transmitted to the interior of said tube by said bores and is detected by said device.

2. The receiver defined in claim 1 wherein said radial bores have a configuration forming nozzles.

3. The receiver defined in claim 1 wherein said array is formed by pluralities of equally angularly spaced radial bores lying in a plurality equally spaced parallel planes transverse to the length of said tube.

4. The reciever defined in claim 1 wherein said hydraulic fluid is maintained at a minimum pressure of 0.01 bar.

5. The receiver defined in claim 1 wherein said hydraulic fluid is water.

6. The receiver defined in claim 5 wherein said water contains an anti-freeze agent.

7. The receiver defined in claim 1 wherein said tube is supported at end faces of said housing.

8. The receiver defined in claim 1 wherein said connection means at one end of said tube is a coupling which penetrates the end face of said housing therat.

9. The receiver defined in claim 8 wherein the other end of said tube opposite the connected end is provided with closure means.

10. The receiver defined in claim 9 wherein said closure means is a venting screw.

11. The receiver defined in claim 1 wherein a plurality of said receivers are assembled to form a tread mat, said plurality of receivers being commonly connectable to said pressure evaluation device.

* * * * *